June 11, 1929. H. DAVIES 1,716,428
APPARATUS FOR FORMING PIPE JOINTS
Filed March 2, 1927 2 Sheets-Sheet 2
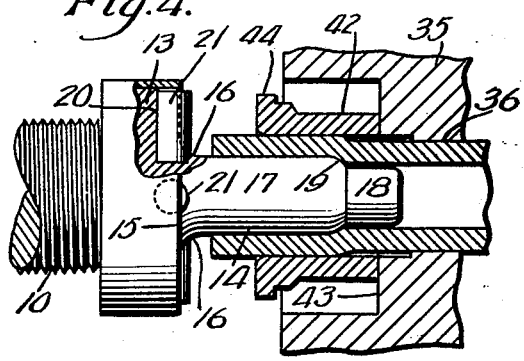
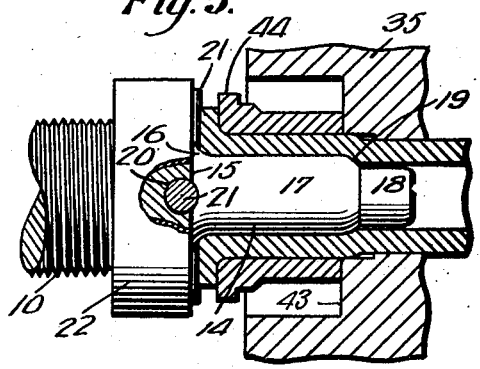
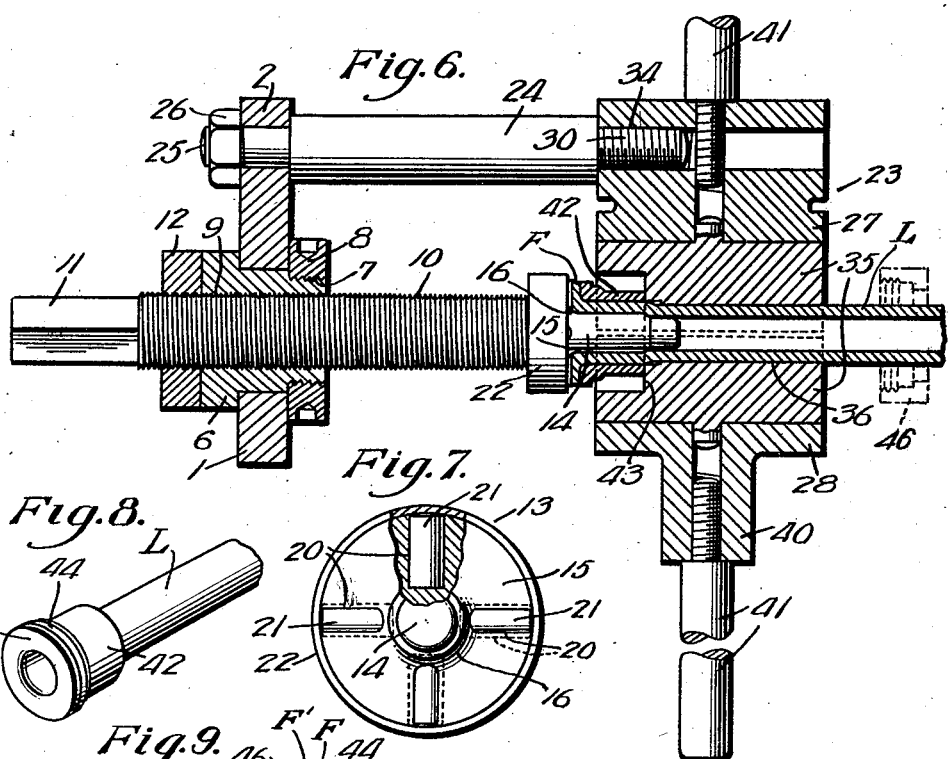
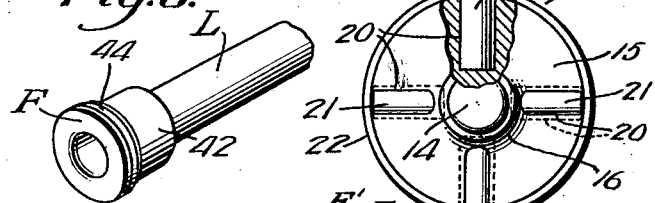
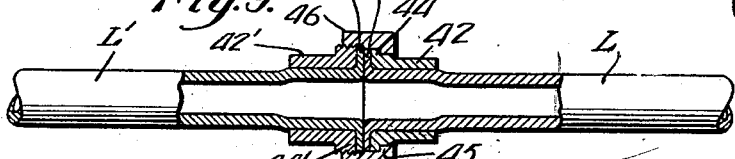
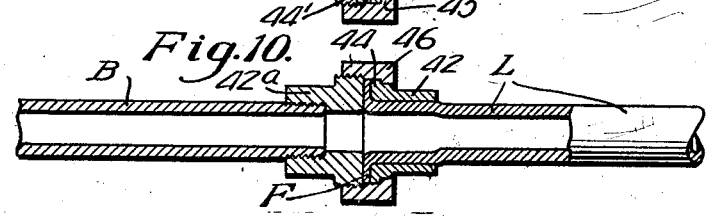
INVENTOR
Hugh Davies
BY
ATTORNEYS Patented June 11, 1929.

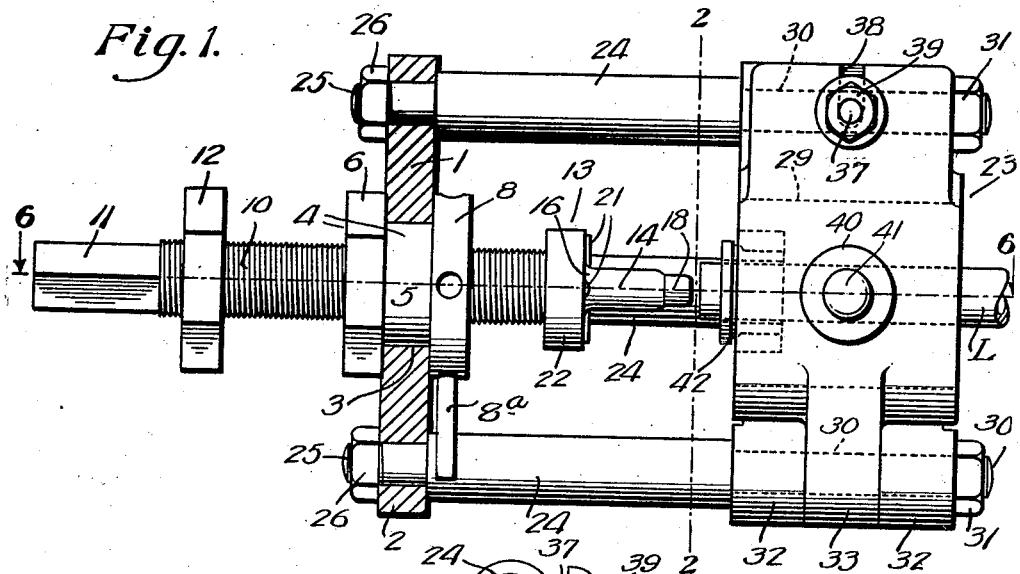
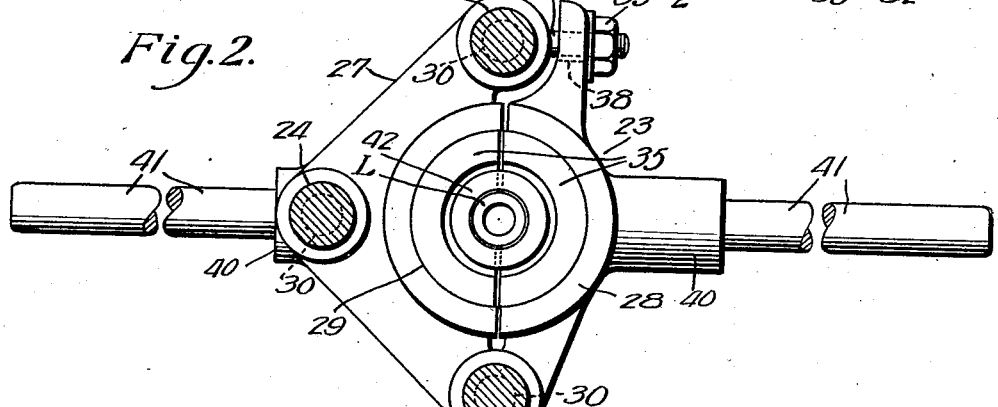
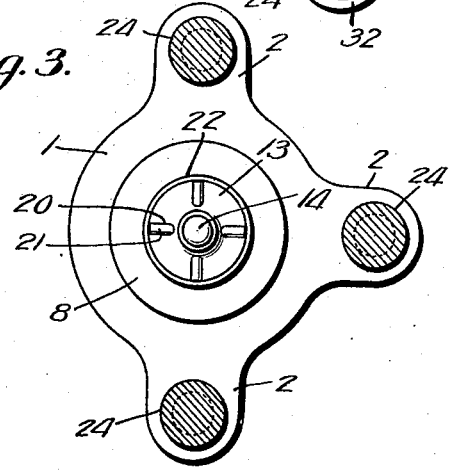

1,716,428

UNITED STATES PATENT OFFICE.

HUGH DAVIES, OF UNION CITY, NEW JERSEY.

APPARATUS FOR FORMING PIPE JOINTS.

Application filed March 2, 1927. Serial No. 172,060.

It is customary at present to join a pipe of soft metal, such as lead, to another pipe by forming between them what is known to plumbers as a "wiped joint". Such a joint is formed by expanding the end of one of the pipes, fitting it over the end of the other pipe, and securing together the overlapped ends to make the joint tight and leak proof by "wiping" the solder around the pipe at the joint. These joints often prove very weak and faulty owing to the fact that many plumbers are not sufficiently skilled to properly form them. Frequently also the working space at the location of the joint is so limited as to render it difficult to properly perform the soldering operation.

The main object of this invention is to provide an apparatus for securing to the end of a lead or other soft metal pipe, by pressure and without solder, a coupling member or members by means of which the lead pipe may be coupled or connected to the end of another pipe by an ordinary standard screw coupling or any other form of coupling means.

Another object of the invention is to provide a simple, compact, portable device for the purpose set forth.

In the drawings:

Fig. 1 is a side elevation partly in section of the apparatus or device for forming the pipe joint;

Fig. 2 a transverse section taken on the line 2—2 of Fig. 1, looking toward the right;

Fig. 3 a transverse section taken on the line 2—2 of Fig. 1, looking toward the left;

Figs. 4, 5 and 6 are sectional views taken on the line 6—6 of Fig. 1 showing three stages of the forming operation;

Fig. 7 a detail end view of the forming tool, parts being broken away;

Fig. 8 a perspective view of the end of a lead pipe prepared for joining it to another pipe;

Fig. 9 a sectional view showing a joint between two lead pipes; and

Fig. 10 a sectional view showing a joint between a lead pipe and a hard metal pipe.

Referring by numerals to the various parts of the device, 1 is a tool-supporting head in the form of a flat plate having a central portion circular in outline, and three outwardly extending ears 2. Two of the ears 2 are located at diametrically opposite sides of the central portion of the plate and the third ear is located at one side midway between the other two. The plate is centrally formed with a bore 3 in which is mounted a bushing 4. This bushing is formed with a cylindrical portion 5 which is received in the bore 3, and an integral head flange 6 at one end to abut the outer face of the plate 1, and its opposite end is reduced and threaded as at 7. Threaded upon said reduced end is a nut 8 which forms a removable flange to abut the inner face of the plate 1 and removably hold the bushing in place. The bushing is formed centrally with a longitudinal, threaded opening 9.

Threaded through the opening 9 of the bushing is the threaded shank 10 of a pipe-expanding and flange-forming tool. The shank is of materially greater length than the bushing, and is formed with a reduced outer end 11 which is squared for engagement with a wrench. Threaded upon the shank, between said squared end and the head of the bushing, is a check nut 12. Formed upon the inner end of the shank 10 is a head 13 of cylindrical shape having a greater diameter than the shank. A pipe-entering tool element 14 in the form of a mandrel is integrally formed with the shank 10 and the head 13 and extends axially from the head. The head is formed with a flat, transverse end face 15 which surrounds the base or root of the mandrel and the mandrel is flared outwardly or rounded at the root as at 16 to merge with said flat face. The mandrel is cylindrical for a material distance outwardly from the root as at 17 and terminates in a reduced end portion 18. A rounded portion 19 merges the end 18 with the body of the mandrel. Four radial grooves 20 are formed in the flat face 15 of the head 13 and are equally spaced, ninety degrees apart around the tool axis. These grooves form the greater portion of a circle in cross section and extend inwardly for a slight distance beneath the flared root 16 of the mandrel and outwardly through the periphery of the head 13. Mounted in each groove 20 is a cylindrical roller 21. These rollers extend substantially the full length of the grooves and their inner ends underlie the outwardly flared portion 16 at the root of the mandrel. A portion of the periphery of each roller extends outwardly a slight distance beyond the flat face 15 and said projecting portions are all tangent to the same transverse plane. The cross sectional form of the grooves prevents the rollers from dropping out through the flat face 15 and a retaining ring 22 is secured upon the head 13 to close the outer ends of the grooves and prevent endwise displacement of the rollers.

A pipe-holding clamp or chuck 23 is held to the tool-holding plate in a fixed spaced relation thereto by three spacing bolts 24. At one end these bolts are formed with reduced threaded ends 25 which pass through apertures formed in the ears 2 of the plate. Nuts 26 are threaded upon these reduced ends to bear against the outer face of the plate and rigidly hold the bolts to the plate. The clamp 23 is formed with a rigid section 27 and a hinged section 28. These sections are so formed that when the clamp is closed they form a substantially cylindrical bore 29 in axial alinement with the tool. The bolts 24 are formed with reduced ends 30 which pass through apertures in the clamp section 27. The uppermost bolt, with reference to Figs. 1 and 2, passes entirely through the clamp section 27 and has a nut 31 threaded upon its outer end to bear against the outer face of said section. The lowermost bolt passes through two apertured hinge ears or knuckles 32, formed on the section 27, and through an apertured hinge ear or knuckle 33 formed upon the clamp section 28. The latter section pivots upon the bolt and is thereby hinged to the rigid section 27. A nut 31 is also threaded upon this bolt. The intermediate bolt, at the side, is threaded part way into a threaded aperture 34 formed in the section 27. The section 27 is thus rigidly connected to the tool support 1.

The sections 27 and 28 are formed to separate along a diametrical plane extending through the upper and lower bolts 24, and in the bore 29 is mounted a split bushing 35 formed in halves which are removably mounted in the sections 27 and 28 respectively. When the clamp is closed the bushing defines a cylindrical bore 36 in axial alinement with the tool and of a size to grip the pipe which is to be operated upon by the tool. Swiveled upon the upper bolt 24 is an eye-bolt 37. The section 27 is notched to accommodate the eye of said bolt 37 and the section 28 is formed with a notch 38 to receive the shank of the eyebolt. A nut 39 is threaded upon the shank to draw the clamp section 28 toward the section 27. Each section is formed at its outer side with a threaded socket 40 into which is screwed the end of a bar 41 of any suitable length for holding the device. These bars extend out from the clamp at diametrically opposite points.

The device is operated as follows: A lead pipe L is placed in the clamp bushing. Upon the pipe is placed a coupling sleeve 42 formed of relatively hard metal, such as brass, for example. One end of this sleeve is bottomed against an abutment face 43 formed upon the bushing 35 and the pipe is left with its end projecting from the sleeve inwardly toward the tool an extent depending upon the size of a flange which is to be formed upon the pipe. The clamp is then closed and caused to tightly grip the pipe by turning the nut 39. The proportions of the tool bear a definite relation to the diameter of the pipe, both the tool and the clamp bushing being removable from the body of the device and replaceable by other tools and bushings to fit pipes of different sizes. When the pipe has been firmly clamped the bars 41 are grasped and a wrench, preferably a ratchet one, is engaged with the squared end 11 of the tool shank to turn the tool and advance it toward the pipe. The check nut 12 is located back upon the tool shank sufficiently to avoid obstructing the advance thereof. The head 6 of the threaded bushing 4 is provided with flat faces whereby it may be held if it tends to turn during the initial movement of the tool.

The reduced end 18 of the tool is of a size to freely enter the pipe L. The portion 17 of the tool following the reduced end is larger than the internal diameter of the pipe. When it is forced into the pipe, therefore, the pipe will be expanded or spread, and forced into intimate contact and binding engagement with the entire interior surface of the coupling sleeve 42 as shown in Figs. 4 and 5. When the mandrel 14 has progressed through the pipe a certain distance the rollers 21 come into engagement with the annular end edge of the pipe and as the rotation and advance of the tool continues the lead forming the end of the pipe is compressed back upon the outer end of the coupling sleeve 42 and is ironed by the rollers into the form of an outwardly extending flange as shown in Fig. 5. The coupling sleeve is firmly held against endwise movement away from the tool by its engagement with the abutment 43 during the flange-forming operation. During this operation the threaded bushing 4 is automatically held against rotation by friction due to the reaction which is transmitted through the shank and forces the flange 8 tightly against the plate 1, and also by the friction between the bushing and its bearing surface in said plate. In actual use of the device it has been found that the friction is in some instances, sufficient to hold the bushing against turning. If in certain operations, however, the bushing is caused to turn, it may be positively locked, by inserting into one of several openings formed in the periphery of the flange 8, a small rod 8ª of sufficient length to engage one of the bolts 24, as shown in Fig. 1.

When the flange-forming operation of the tool has produced a flange of the proper size, the check nut 12 is screwed forward to tightly bind it to the head 6 of the bushing 4. The bushing is thus bound to the tool shank to rotate with it. The tool is then rotated without advancing it and the rollers 21 revolve in the same plane and flatten out the surface of the flange to give it a good, smooth finish. It has been found, in many operations, that for the flange finishing operation it is only necessary to remove the rod 8ª to permit the bushing or sleeve to rotate with the shank. The lock nut 12 when screwed up against the sleeve prevents any tendency of the shank to advance during the finishing operation. When this finishing operation is completed the tool is retracted and the clamp is opened to free the pipe from the device. When retracting the shank 10 and the tool carried thereby the sleeve or bushing may be held against rotation, if found desirable or necessary by using the rod 8ª or by grasping the flange 6, or in any other suitable manner. Ordinarily the friction of the sleeve in the supporting frame will be sufficient to hold it against rotation while the shank is being retracted. By providing the removable rod 8ª, the angular head 6 and the locking nut 12 the proper cooperation between the threaded bushing or sleeve and the shank may be secured under practically any conditions of ordinary use.

The pipe end now has the form shown in Fig. 8, having an out-turned lead flange F firmly backed up by the hard metal coupling sleeve 42. The expanding pressure of the mandrel and the pressure of the rollers in forming the flange cause the opposed surfaces of the coupling and pipe to become intimately united and frozen together so that the sleeve becomes a rigidly attached permanent part of the pipe end.

Fig. 9 shows two lead pipes joined by my improved joint structure. The end of the coupling sleeve over which the flange "F" extends is slightly enlarged to form a flange 44. This latter flange forms an abutment which is engaged by the inwardly extending flange 45 of a threaded coupling or union member 46. The companion pipe L' is formed with a flange F' similar to the flange F and backed up by a sleeve 42'. This sleeve has its out-turned flange 44' threaded for engagement with the union member 46. When said member is screwed tight the lead flanges F and F' are held firmly together to make a good joint.

In Fig. 10 is shown a joint structure for a lead pipe and a pipe formed of hard metal, such as brass for example. In this case the sleeve 42, the member 46 and the flange F are the same as formerly. A hard metal coupling sleeve 42ª is, however, substituted for the coupling sleeve 42'. The sleeve 42ª is internally threaded to receive the threaded end of the brass pipe B and is formed to directly abut the flange F of the lead pipe L. Both of the joints described may be opened when desired by unscrewing the member 46, thereby offering an additional advantage over the "wiped joint." The member 46 is placed upon the pipe L before the coupling sleeve 42 is placed in position and the flange formed. During the flanging operation said member may rest upon the pipe in an inwardly spaced position, clear of the clamp 23, as indicated in dotted lines in Fig. 6.

What I claim is:

1. A tool for the purpose set forth comprising a threaded shank; a mandrel end extending axially outward from one end of said shank, formed with a reduced outer end and flared outwardly at its root; an enlarged head at the juncture of the mandrel and shank, rigid with both and formed with a face surrounding the root of the mandrel, disposed transversely thereof and directed toward the outer end of the mandrel, the head being formed with a plurality of radial grooves in said transverse face extending outwardly from the mandrel and inwardly beneath the outwardly flared portion of the root thereof; radially disposed rollers in said grooves having their inner ends extending beneath the flared portion of the mandrel and their peripheral surfaces extending outwardly beyond the transverse surface surrounding the mandrel; and means retaining said rollers in the grooves.

2. A device for forming a joint-flange on the end of a lead pipe, comprising a tool support; an internally threaded bushing rotatably mounted in said support; means carried by said bushing to engage the said support to take up axial thrust thereon; a tool shank threaded through the said bushing and rotatable independently of said bushing; movable means to hold the bushing against rotation while rotating the tool shank; a pipe expanding mandrel extending axially from the inner end of the tool shank and adapted to enter and expand the end of a lead pipe; a pipe-flange forming means extending transversely at the root of the said mandrel and adapted to engage the end of the pipe and force it inwardly toward the body of the pipe as the tool shank is rotated and advanced in the said bushing; a pipe clamping means to hold the pipe in axial alignment with the tool; means for holding the tool support in fixed relation to the pipe clamp; and means for rotating the tool-shank.

3. A device for forming a joint-flange on the end of a lead pipe, comprising a tool support; an internally threaded bushing rotatably mounted in said support; means carried by said bushing to engage the said support to take up axial thrust thereon; a tool shank threaded through the said bushing and rotatable independently of said bushing; a pipe expanding mandrel extending axially from the inner end of the tool shank and adapted to enter and expand the end of a lead pipe; a pipe-flange forming means extending transversely at the root of the said mandrel and adapted to engage the end of the pipe and force it inwardly toward the body of the pipe as the tool-shank is rotated and advanced in the said bushing; a pipe clamping means to hold the pipe in axial alignment with the tool; means for holding the tool support in fixed relation to the pipe clamp; means adjustable to hold the bushing against rotation or to permit it to rotate whereby the tool may be rotated and advanced through the bushing for forming the flange and rotated or held against advancement for finishing the face of the formed flange.

4. A device for forming a joint-flange on the end of a lead pipe, comprising a tool support; an internally threaded bushing rotatably mounted in said support; means carried by said bushing to engage the said support to take up axial thrust thereon; a tool shank threaded through the said bushing and rotatable independently of said bushing; movable means to hold the bushing against rotation while rotating the tool shank; a pipe-expanding mandrel extending axially from the inner end of the tool shank and adapted to enter and fill the lead pipe to prevent distortion of the end of the pipe during the flange forming operation; a pipe-flange forming means extending transversely at the root of the said mandrel and adapted to engage the end of the pipe and force it inwardly toward the body of the pipe as the tool-shank is rotated and advanced in the said bushing; a pipe clamping means to hold the pipe in axial alignment with the tool; means for holding the tool support in fixed relation to the pipe clamp; and means for rotating the tool shank.

5. A unitary, portable pipe-flanging device comprising a tool-carrying head; an internally threaded sleeve rotatably mounted in said head and held against endwise movement; a pipe-flanging tool provided with a threaded shank threaded through said sleeve, pipe-clamping means to hold a pipe in axial alinement with said tool; means connecting the tool head and clamping means and rigidly holding them in a fixed spaced relation, the tool being adapted to rotate and advance toward the clamping means when the shank is turned; and means adjustable to either prevent the sleeve from rotating with the tool when the latter is rotated to advance the tool to form the pipe flange, or to permit the sleeve to rotate with the tool to stop the advance of the tool.

6. A unitary, portable pipe-flanging device comprising a tool-carrying head; an internally threaded sleeve rotatably mounted in said head and held against endwise movement; a pipe-flanging tool provided with a threaded shank threaded through said sleeve; pipe-clamping means to hold a pipe in axial alinement with said tool; means connecting the tool head and clamping means and rigidly holding them in a fixed spaced relation, the tool being adapted to rotate and advance toward the clamping means when the shank is turned; and means adjustable to lock the sleeve to the frame to prevent rotation of the sleeve or to free the sleeve for rotation with the shank.

7. A unitary, portable pipe-flanging device comprising a tool-carrying head; an internally threaded sleeve rotatably mounted in said head and held against endwise movement; a pipe-flanging tool provided with a threaded shank threaded through said sleeve, pipe-clamping means to hold a pipe in axial alinement with said tool; means connecting the tool head and clamping means and rigidly holding them in a fixed spaced relation, the tool being adapted to rotate and advance toward the clamping means when the shank is turned; means adjustable to lock the sleeve to the frame; and means adjustable to lock the sleeve to the threaded shank.

8. A unitary, portable pipe-flanging device comprising a tool-carrying head; an internally threaded sleeve rotatably mounted in said head and held against endwise movement; a pipe-flanging tool provided with a threaded shank threaded through said sleeve; pipe-clamping means to hold a pipe in axial alinement with said tool; means connecting the said tool head and clamping means and rigidly holding them in a fixed spaced relation, the tool being adapted to rotate and advance toward the clamping means when the shank is turned; means to normally prevent the sleeve from rotating with the tool when the latter is operated to form the pipe flange; and a lock nut threaded upon the tool shank and engageable with the threaded sleeve to lock the latter to rotate with the shank.

9. A unitary, portable pipe-flanging device comprising a tool-carrying head; an internally threaded sleeve rotatably mounted in said head and held against endwise movement; a pipe-flanging tool provided with a threaded shank threaded through said sleeve; pipe-clamping means to hold a pipe in axial alinement with said tool; means connecting the said tool head and clamping means and rigidly holding them in a fixed spaced relation, the tool being adapted to rotate and advance toward the clamping means when the shank is turned; means to normally prevent the sleeve from rotating with the tool when the latter is operated to form the pipe flange; and adjustable means on the tool shank and engageable with the threaded sleeve to lock the latter to rotate with the shank.

10. A unitary, portable pipe-flanging device comprising a tool-carrying head; an internally threaded sleeve rotatably mounted in said head and held against endwise movement; a pipe-flanging tool provided with a threaded shank threaded through said sleeve; pipe-clamping means to hold a pipe in axial alinement with said tool; means connecting the said tool head and clamping means and rigidly holding them in a fixed spaced relation, the tool being adapted to rotate and advance toward the clamping means when the shank is turned; means adjustable to prevent the sleeve from rotating with the tool when the latter is rotated to advance the tool to form the pipe flange; and means engageable with the threaded sleeve to lock the latter to rotate with the shank.

11. A unitary, portable pipe-flanging device comprising a tool-carrying head; an internally threaded sleeve rotatably mounted in said head and held against endwise movement; a pipe-flanging tool provided with a threaded shank threaded through said sleeve; pipe-clamping means to hold a pipe in axial alinement with said tool; means connecting the said tool head and clamping means and rigidly holding them in a fixed spaced relation, the tool being adapted to rotate and advance toward the clamping means when the shank is turned; and means engageable with the threaded sleeve to lock the latter to rotate with the shank.

12. A unitary portable pipe-flanging device comprising a tool-carrying head; an internally threaded sleeve rotatably mounted in said head and held against endwise movement; a pipe-flanging tool provided with a threaded shank threaded through said sleeve; pipe-clamping means to hold a pipe in axial alinement with said tool; means connecting the tool head and clamping means and rigidly holding them in a fixed spaced relation, the tool being adapted to rotate and advance toward the clamping means when the shank is turned; and means to at will permit the sleeve to rotate with the rotating threaded shank or to hold it against rotation, whereby the tool may be caused to rotate without advancing or to rotate and advance.

13. A unitary portable pipe-flanging device comprising a tool-carrying head; an internally threaded sleeve rotatably mounted in said head and held against endwise movement; a pipe-flanging tool provided with a threaded shank threaded through said sleeve; pipe-clamping means to hold a pipe in axial alinement with said tool; means holding the tool head and clamping means in a fixed spaced relation, the tool being adapted to rotate and advance toward the clamping means when the shank is turned; and means to at will permit the sleeve to rotate with the rotating threaded shank or to hold it against rotation, whereby the tool may be caused to rotate without advancing or to rotate and advance.

14. A unitary portable pipe-flanging device comprising a tool-carrying head; an internally threaded sleeve rotatably mounted in said head and held against endwise movement; a pipe-flanging tool provided with a threaded shank threaded through said sleeve; pipe-clamping means to hold a pipe in axial alinement with said tool; and means to at will permit the sleeve to rotate with the rotating threaded shank or to hold it against rotation, whereby the tool may be caused to rotate without advancing or to rotate and advance.

15. A unitary portable pipe-flanging device comprising a tool-carrying head; an internally threaded sleeve rotatably mounted in said head and held against endwise movement; a pipe-flanging tool provided with a threaded shank threaded through said sleeve; pipe-clamping means to hold a pipe in axial alinement with said tool; means connecting the tool head and clamping means and rigidly holding them in a fixed spaced relation, the tool being adapted to rotate and advance toward the clamping means when the shank is turned; and hand-holds for the device in the form of straight bars rigidly and detachably connected to the device and extended outward from opposite sides thereof.

16. A pipe-flanging tool comprising a mandrel formed with a reduced outer end, an outwardly flared root and an elongated cylindrical medial portion between said end and root; an enlarged head at the root of the mandrel rigid therewith and formed with a face surrounding the root, disposed transversely thereof and directed toward the outer end of the mandrel said head being formed with a plurality of radial grooves in said transverse face extending outwardly from the mandrel and inwardly beneath the outwardly flared portion of the root thereof; radially disposed rollers in said grooves having their inner ends extending beneath the flared root and their peripheral surfaces extending outwardly beyond said transverse face surrounding the mandrel; and means retaining said rollers in the grooves.

17. A pipe-flanging tool comprising a mandrel formed with a reduced outer end; an outwardly flared root, and an elongated cylindrical medial portion between said root and outer end; an enlarged head at the root of the mandrel, rigid therewith, formed with a face surrounding the root disposed transversely thereof and directed toward the outer end of the mandrel; and a plurality of transversely rounded flange-forming projections extending outwardly over said transverse face radially from the mandrel root at points spaced around the latter.

18. A unitary portable pipe-flanging device comprising a tool support; a threaded tool shank threaded through said support; a mandrel extending axially from one end of said shank; an enlarged head at the juncture of said mandrel and shank rigid with both to rotate with them and formed with a face surrounding the root of the mandrel, disposed transversely thereof and directed toward the outer end of the mandrel the head being formed with a plurality of radial grooves in said transverse face extending outwardly from the mandrel; radially disposed rollers in said grooves having their peripheral surfaces extending outwardly beyond said transverse face surrounding the mandrel; means retaining said rollers in their grooves; pipe-clamping means to hold a pipe in axial alinement with the mandrel; and means rigidly connecting together said tool support and pipe-clamping means and holding them in a fixed spaced relation.

In testimony whereof I hereunto affix my signature.

HUGH DAVIES.